US008890949B2

(12) United States Patent
Held et al.

(10) Patent No.: US 8,890,949 B2

(45) Date of Patent: Nov. 18, 2014

(54) ANALYSIS DEVICE AND METHOD FOR ANALYZING A THERMOFORMING PROCESS IN A THERMOFORMING LAMINATING DEVICE

(75) Inventors: Lothar Held, Lampertheim (DE); Sascha Hayer, Biblis (DE)

(73) Assignee: Renolit SE, Worms (DE)

( * ) Notice: Subject to any disclaimer, the term of this patent is extended or adjusted under 35 U.S.C. 154(b) by 504 days.

(21) Appl. No.: 13/379,137

(22) PCT Filed: Jun. 21, 2010

(86) PCT No.: PCT/EP2010/003736

§ 371 (c)(1), (2), (4) Date: Feb. 29, 2012

(87) PCT Pub. No.: WO2011/006576

PCT Pub. Date: Jan. 20, 2011

(65) Prior Publication Data

US 2012/0147174 A1 Jun. 14, 2012

(30) Foreign Application Priority Data

Jun. 25, 2009 (DE) ........................ 10 2009 030 656

(51) Int. Cl.

| | |
|---|---|
| ***H04N 7/18*** | (2006.01) |
| ***B29C 51/46*** | (2006.01) |
| *B29C 51/10* | (2006.01) |

(52) U.S. Cl.

CPC ................ *B29C 51/46* (2013.01); *B29C 51/10* (2013.01); *B29C 2791/006* (2013.01)

USPC ........................................................ 348/88

(58) Field of Classification Search

CPC .... B29C 2791/006; B29C 51/10; B29C 51/46

USPC ........................................................ 348/88

See application file for complete search history.

(56) References Cited

U.S. PATENT DOCUMENTS

| | | | | |
|---|---|---|---|---|
| 8,753,106 | B2 * | 6/2014 | Lee et al. | 425/403.1 |
| 2011/0074057 | A1 * | 3/2011 | Lee et al. | 264/40.5 |
| 2011/0188115 | A1 * | 8/2011 | Sharp et al. | 359/465 |

FOREIGN PATENT DOCUMENTS

| | | |
|---|---|---|
| DE | 10 2008 038 080 A1 | 5/2009 |
| EP | 0 374 735 A2 | 6/1990 |

OTHER PUBLICATIONS

International Search Report, PCT/EP2010/003736, Oct. 7, 2010, 2 pgs.

*Primary Examiner* — Behrooz Senfi

(74) *Attorney, Agent, or Firm* — Paul D. Strain, Esq.; Strain & Strain PLLC

(57) ABSTRACT

The present invention relates to an analysis device (10) for analyzing a thermoforming process in a thermoforming laminating device (20), wherein the analysis device (10) comprises a pressure housing (17) having a pressure resistance of up to 5 bar. At least one image recording device (12) that is connected to a data storage device (13) and one lighting device (11) is disposed in the pressure housing. A lens (12') of the image recording device (12) is disposed adjacent to a light outlet opening (11) of the lighting device (11) in a housing wall of the housing (17), and the analysis device (10) comprises a temperature resistance of at least up to 50° C. The invention further relates to an analysis method for analyzing thermoforming processes in a thermoforming laminating device that can be performed by means of the analysis device (10) according to the invention.

16 Claims, 3 Drawing Sheets

Figure 1:
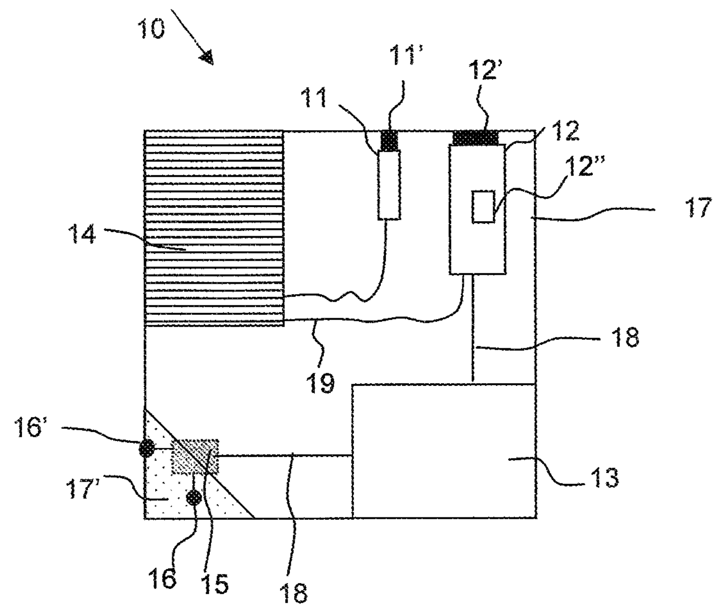

ANALYSIS DEVICE AND METHOD FOR ANALYZING A THERMOFORMING PROCESS IN A THERMOFORMING LAMINATING DEVICE

CROSS-REFERENCE TO RELATED PATENT APPLICATIONS

This application is a National Stage of International Application No. PCT/EP2010/003736, filed Jun. 21, 2010, which is based upon and claims the benefit of priority from prior German Patent Applications No. 10 2009 030 656.0, filed Jun. 25, 2009, the entire contents of all of which are incorporated herein by reference in their entirety.

The present invention relates to analysis devices for analyzing thermoforming processes in a thermoforming laminating device and to the corresponding analyzing method that can be carried by means of said analysis device.

Laminating or coating workpieces for finishing their surfaces is carried out in laminating machines which can be designed as vacuum presses or diaphragm vacuum presses. The known laminating process follows a workflow in which the workpiece is first placed onto a laying table and the film provided for coating is disposed above the workpiece. The films which are thermally deformable are then applied as a layer onto the workpieces, which often are also structured, by bringing the workpiece together with the film disposed thereabove into an evacuable chamber of the laminating press via introducing the laying table therein. The heating plate disposed above the film provides the softening temperature of the film.

Alternative press systems provide that a diaphragm is disposed between the film and the heating plate so that by evacuating the corresponding chamber, film and membrane sink toward the workpiece. In doing so, the film is heated and softened therein and, during a subsequent pressure buildup, is sucked onto the workpiece to be laminated with the support of a vacuum applied from the table's side while the film still has the desired softening temperature. The diaphragm and the film do not adhere to one another; thus, the diaphragm can be spaced apart by lifting it from the film formed onto the workpiece.

As an alternative, bringing the film to temperature is carried out in presses without diaphragms by sucking the film onto the heating plate. After the heating time during which the film softens, forming of the film onto the workpiece to be laminated takes place through pressure and vacuum. Due to the heat transfer from the film to the workpiece coated with adhesive, the adhesive is activated. At the same time, the temperature decreases and the workpiece together with the film fixed thereon begins to cool down. The cooling process is finished upon complete solidification of the film.

In order to properly edge door leaves or picture frames, the workpieces to be laminated can be spaced apart from the laying surface of the laying table by means of support pins or suitably shaped spacer parts so as to achieve that when sucking the film onto the workpiece, the film properly and fully encompasses the edges.

The process flow can be optimized by suitable temperature control and adequate arrangement of the workpieces on the laying table; also, the pressures applied in the evacuable chamber can be controlled and influence the laminating result. Further parameters such as, for example, air humidity in the vacuum chamber influence the laminating result.

A multiplicity of laminated or, respectively, coated workpieces show damage immediately after the production process or after being used a few times, or have the tendency of being faulty at critical sections such as edges or complex structures, like indentations in the workpiece. It occurs that the film quality is not sufficient and it thus cracks, breaks under minor load or forms poorly. This happens frequently specifically in the case of corners; faulty edgings come loose.

It is therefore desirable to provide a device and a method which make it possible that the laminating process can be analyzed directly during its progression and potential weaknesses of the method can be identified.

The analysis device with the features of the claim 1 achieves the object of providing an in-situ analysis device for analyzing thermoforming processes in a thermoforming laminating device.

The object of providing in-situ an analysis method for examining thermoforming processes in a thermoforming laminating device is disclosed by means of the method with the features of the claim 14.

Refinements of the device and the method are set forth in the respective sub-claims.

One embodiment of the analysis device according to the invention which is suitable for analyzing thermoforming processes directly in a thermoforming laminating device comprises a pressure housing which resists a pressure of up to 5 bar. Moreover, all analysis components present in the analysis device are advantageously temperature-resistant up to 80° C., but at least up to 50° C.

The analysis device comprises an image recording device and a lighting device. Said image recording device is connected to a data storage device and its lens is disposed in the immediate vicinity of the light outlet opening of the lighting device. Hence, it is advantageously possible to dispose the analysis device during a thermoforming process in the thermoforming laminating device next to, in, or on a workpiece subjected to the lamination. The image recording device can involve a camera such as a digital camera which can be suited for recording individual images, but rather more suitably records a film of the workflow of the laminating process.

Thus, it is possible to observe the behavior and the arrangement of the film provided for coating during the laminating process and to track the film's behavior beginning with the softening until it finally sinks down onto the workpiece and is sucked thereon. With an advantageous camera resolution of at least 640×480 pixels, images of the thermoforming process can be obtained which immediately provide information about the workflow of the process and thus about incorrect workflows.

If, in a further embodiment, said camera is equipped with a swiveling lens, the laminating process can be reproduced at different places of the workpiece.

Furthermore, it is advantageous if the analysis device is equipped with acoustic signal sensors such as a microphone because the thermoforming process which runs under significant pressure changes and which also comprises the subsequent lowering of the film onto the workpiece is associated with a multiplicity of noises which are caused by air suction and air supply. The acoustic analysis thus offers the possibility to also detect incorrect pressure profiles.

In order to further optimize the analysis device with respect to the measuring parameters to be recorded, a temperature recording device, a pressure measuring device, and/or a humidity measuring device can be disposed in the housing. In particular temperature recording devices which can comprise known temperature sensors or data loggers make it possible that the housing, which accommodates the components of the analysis device, can be equipped on its upper side and/or on the side walls with temperature sensing elements. Thus, it is advantageously possible to examine the actual temperatures at different places, on the one hand, in the room and, on the other, at the lower side of the coating film, at the diaphragm, if the device is a diaphragm thermoform press, or at edges as also present on the workpiece.

Advantageously, the recorded images and the further measuring data are stored by means of a data storage device. The transfer to such storage devices which, for example, can be configured as secure digital memory card (SD memory card) takes place by means of data transfer lines or via wireless transfer technologies.

Furthermore, it is possible to read out the optical and acoustic signals as well as the temperature, humidity, and pressure signals stored in the data storage after the workflow of the thermoforming process is completed and to evaluate said signals, for example, by graphically displaying the physical parameters and processing the picture material.

Further, it is possible, in particular in the case of wireless data transfer devices, that the recorded data are immediately transferred in-situ to a data processing unit disposed outside of the analysis device. Thus, it is possible to transfer data immediately during their generation onto a monitor and to evaluate said data. This also allows to directly influence parameters which are relevant for the thermoforming process and thus to influence their direct impact on the laminating method.

The analysis method according to the invention which comprises an analysis device having at least one image recording device and one lighting device, wherein the image recording device is connected to a data storage device, provides that the workpiece to be laminated is disposed on a laying table of a thermoforming device before the laminating film is placed above the workpiece. The analyzing device is disposed on the laying table, in close proximity to the workpiece to be laminated, onto the laminating film, or underneath it, next to the workpiece, or in a section of the workpiece if the same is a picture frame, for example. Now, the laminating process is started, wherein the laying table is subjected to temperature and pressure application. As the person skilled in the art knows, this requires to introduce the laying table into the evacuable chamber and to adequately seal the latter.

At the same time or immediately prior to this, the analysis process is started by switching on the image recording device and the lighting device. Recording of data begins. In order that data of a desired section of the workpiece are recorded, the lens of the image recording device or, respectively, the camera or digital camera, and the light coming out of the light outlet opening of the lighting device are directed at the workpiece section to be analyzed. Once the laminating process is completed, the analyzing process can also be completed by switching off the image recording device and the lighting device. By means of suitable timers, the laminating process and the analyzing process can be coordinated with respect to timing. After the analyzing process is completed or even during the still running analyzing process, depending on the analysis device used, the data stored with the data storage device can be read out and interpreted. In particular the use of radio-based transfer technologies allows the in-situ analysis.

Furthermore, the analyzing process can also comprise putting additional measuring devices into operation which can be provided in different embodiments of the analysis device; said measuring devices comprise devices for recording acoustic signals, temperature recording devices, pressure measuring devices and humidity measuring devices.

These and further advantages are explained by the following description with reference to the accompanying figures.

Figure 2:
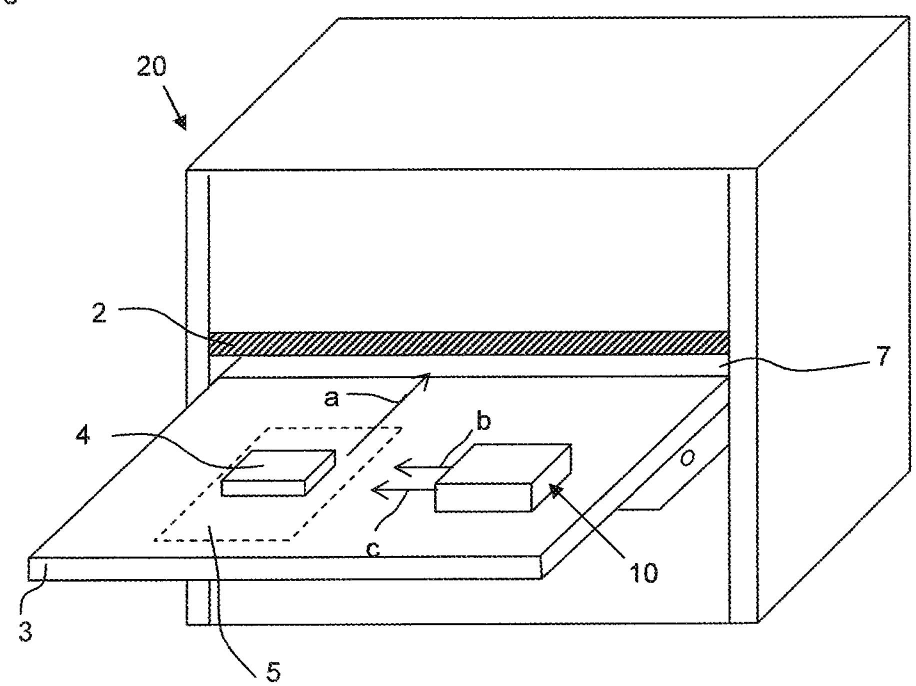
Figure 3:
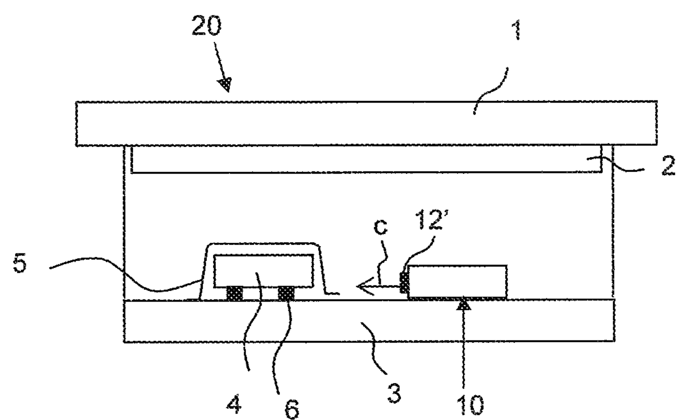
Figure 4A:
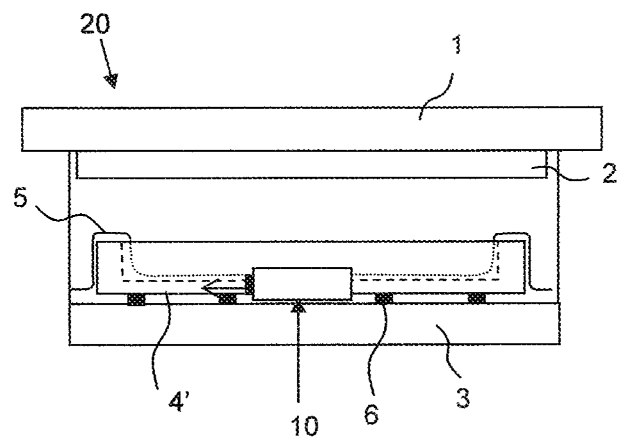
Figure 4B:
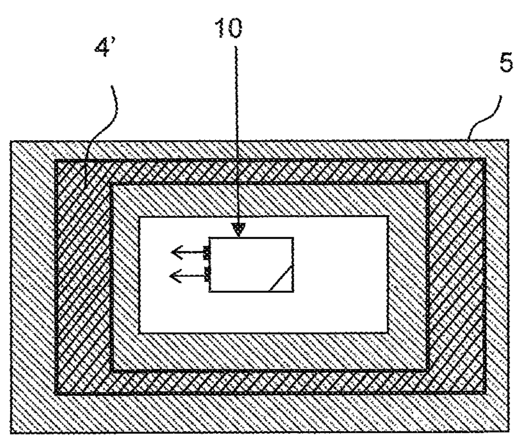
Figure 5:
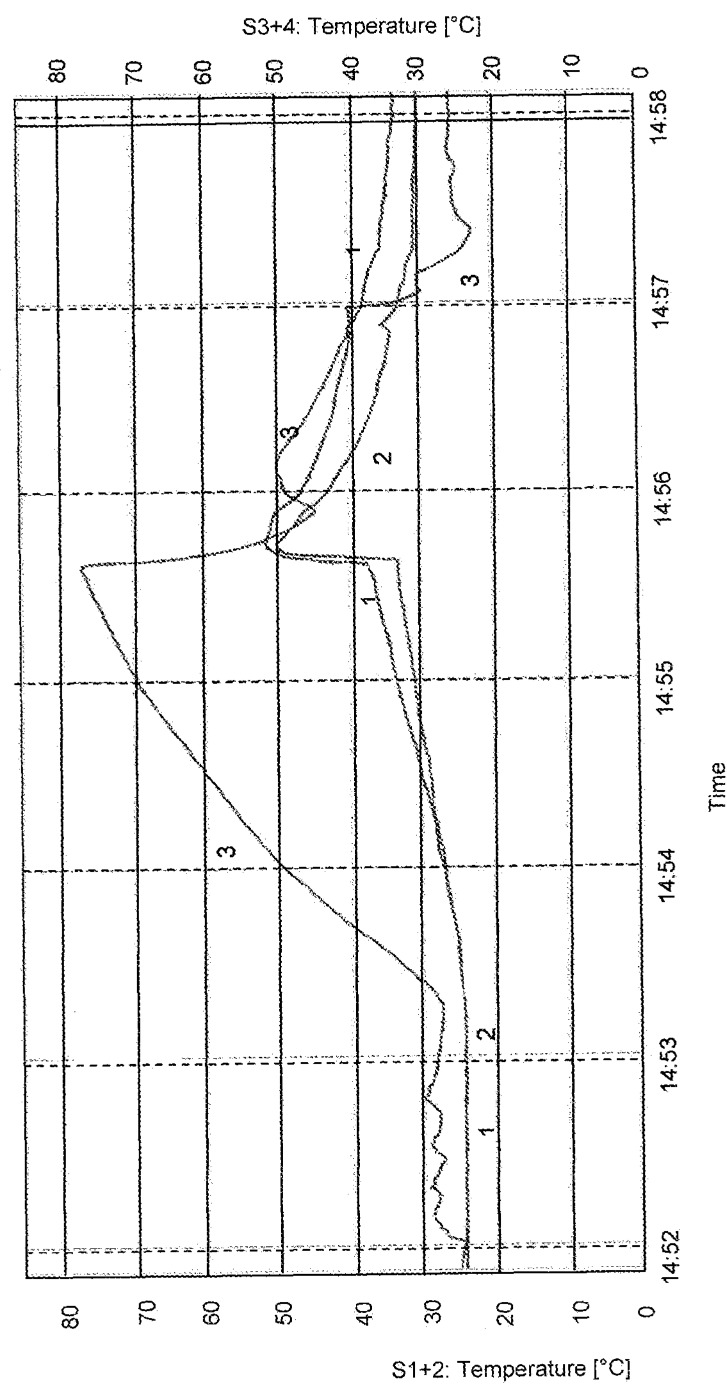

The reference to the figures serves for supporting the description and for a better understanding of the subject matter. Components or portions of components which are substantially identical or similar can be indicated by the same reference number. The figures are only schematic illustrations of exemplary embodiments of the invention. In the figures:

FIG. 1 shows a top view of a schematically shown analysis device,

FIG. 2 shows a vacuum thermoforming press on the laying table of which, an analysis device according to the invention is disposed next to a workpiece, FIG. 3 shows a schematic side view of an analysis device disposed next to workpiece in a thermoforming press, FIG. 4*a* shows an analysis device disposed in a workpiece designed as a frame in a thermoforming press, FIG. 4*b* shows a top view of a frame-shaped workpiece in the recess of which, the analysis device is placed, FIG. 5 shows a temperature profile which was recorded during the thermoforming pressing process.

The embodiments of the analysis device according to the invention are principally suitable for being introduced into different thermoforming presses while the pressing process is carried out. Depending on the pressures occurring in said pressing tools, which usually do not exceed 5 bar, and the temperatures which are necessary to soften the film to be applied onto the workpieces and which substantially do not exceed 80° C., the housings of the analysis device are made in a corresponding pressure- and temperature-resistant manner. The housings comprise substantially a stable plastic frame, preferably made of a thermoset material, which is provided with a bottom and a cover. If an analysis device according to the invention operates only with one image recording device, it is sufficient if for this purpose, the frame has an adequate opening which is provided adjacent to a corresponding lighting device. Likewise, an opening for the light output is to be provided in the lateral frame.

Therefore, it is possible that the room in the thermoforming press is lightened such that the image recording device, which can be a conventional camera for recording still or motion pictures or a digital camera, is sufficiently illuminated during the execution of the pressing process. For this purpose, the lens of the image recording device is disposed in a suitable manner adjacent to the light outlet opening. Advantageously, the lens of the camera can be swiveled so that different sections of the workpiece can be recorded. Suitable digital cameras have a resolution of at least 640×480 pixels.

Furthermore, conventional, commercially available digital cameras are often advantageously already equipped with devices for recording acoustic signals or, respectively, with microphones. This allows that the progression of the evacuation process running in such a thermoforming press can be acoustically tracked. Potential leakages which could result in a corresponding air whistling noise are thus recorded along with the image material and clearly illustrate the overall workflow of the method and sources of errors.

In addition, a temperature measuring device can be provided in the analysis device according to the invention.

FIG. 1 shows schematically an analysis device 10, in the housing 17 of which, a camera 12 having a lens 12' is disposed next to a lighting device 11 having a corresponding light outlet opening 11'. Such a lighting device can involve an LED which consumes little energy, provides good light quality, and in addition, introduces a hardly measurable amount of intrinsic energy into the method and thus causes no disadvantageous temperature increase in the surroundings of the analysis device. In order to ensure this, the housing 17 has to be made in this region from a transparent material.

Finally, a temperature recording device 15 is disposed in the housing 17. Said temperature recording device has two sensing elements 16, 16', wherein the sensing element 16' is disposed on a side wall while the sensing element 16 is quasi positioned on the cover of the housing 17. This is particularly advantageous because in this manner, the temperature profile can be recorded on the upper side and the side of the housing 17, wherein this temperature profile will correspond to a temperature profile on the workpiece 4 which also has upper sides and side sections.

Since the analysis device 10 with the camera 12 can be disposed on the laminating film or underneath the laminating film, it is possible to track the temperature profile also on the lower side of the laminating film. In order to avoid measuring errors caused by the frame which heats up and from which the housing 17 is made, the section 17' in which the temperature sensing elements 16', 16 are integrated, are configured to be exchangeable. FIG. 1 shows an exchangeable corner 17' of the housing 17 which has a triangular base.

It is shown here that the camera 12 and the temperature sensing elements 16', 16 via the temperature recording device 15 are connected to the data recording storage device 13, which is disposed in the housing 17, via data lines 18. Advantageously, the temperature recording device 15 is integrated in the data storage device 13. The energy supply to the LED 11 and to the camera 12 takes place via energy supply lines 19 coming from an accumulator 14. Alternatively, a mains connection could also be provided, or the individual apparatuses could be equipped with suitable batteries.

The embodiment shown in FIG. 1 provides an SD card as a data storage medium so that the data stored on the card, which comprise optical data, acoustic data, and temperature data, are read out with a corresponding card reader after completion of the analyzing method and are further processed with a data processing medium as it is known to the person skilled in the art. Of course, the data transfer can also take place via wireless connections, for example via radio, from the data storage device to the data processing medium wherein, by the way, said data storage device does not have to be a SD card, but can also be a different suitable storage device. Advantageously, the analysis data can be output by means of radio data transfer already during the laminating process and transferred to the data processing medium for evaluation so that the laminating process can be influenced if necessary.

FIG. 1 shows a temperature recording device 15 with the two temperature sensors 16', 16 and the camera 12 equipped with a microphone 12"; furthermore, sensors can be provided such as humidity sensors, pressure sensors, and other sensors which can also be accommodated in the housing 17.

Such temperature, humidity, or pressure sensors can be equipped as temperature loggers so that they have their own storage device and, in addition, are independent with respect to their supply with energy. As shown in FIG. 1, the energy supply can be carried out by means of accumulator 14 which is connected via energy supply lines 19 to the consumers.

FIG. 2 shows a thermoforming press 20 which serves as a laminating device. On the laying table 3, the analysis device 10 is positioned next to the workpiece 4 which, in the present case, is covered with the laminating film 5. Arrow a shows the movement direction of the laying table 3 when the latter is moved into the press 20, arrow b shows the direction of the light coming out of the outlet opening of the lighting device, and arrow c indicates the orientation of the lens of the camera. The objects disposed to each other in this manner are now introduced into the laminating device in that, in the present case, the laying table 3, which is mounted displaceably, is moved into the press chamber 7. The sealing frame 2 sealing the press chamber 7 after positioning the laying table 3 is illustrated in a lifted position from where said frame is lowered onto the laying table 3 upon start of the laminating process.

FIG. 3 shows a view of a workpiece 4 which is placed on a laminating table 3 and which is mounted on laying pins 6 so as to ensure optimal edging by means of the laminating film 5. Said film 5 is placed loosely over the workpiece 4 and the analyzing device 10 with adequately aligned lens 12' (see arrow c) points in the direction of the workpiece 4. When the laminating process is ready to get started, the laminating device 20 is closed by lowering the heating plate 1 together with the sealing frame 2 over the laying table 3. As soon as the frame 2 is closed, the laminating process can begin and the pressure chamber can be evacuated. The film 5 which lies over the workpiece 4 can now be sucked onto a diaphragm (not illustrated) or directly onto the heating plate in order to be heated and can thereby be softened. Upon reaching the desired softening temperature, a pressure reversal can take place, whereby the softened film 5, which does not adhere to the heating plate 1, is lowered onto the workpiece 4 and is sucked thereon and formed in the appropriate manner. When using a diaphragm, a combination of film and diaphragm is lowered over the workpiece, where the coating by adhesive bonding of the film with the workpiece surface takes place, whereas no bonding of the softened film on the diaphragm takes place.

As shown in FIG. 4*a*, it is also possible to dispose the analysis device 10 within a workpiece, for example, a frame 4'. In this case, the analysis device 10 can be placed on the film 5 or, as shown in FIG. 4*b*, in a cut out film region. Thus, the analysis device 10 can illustrate in particular such processes which relate to the edging of sensitive workpiece parts such as the frame 4'.

As shown in FIG. 5, it is possible with the device according to the invention to simultaneously track the temperature progressions on the lower side of the film (see curve 3), and on the upper side of the workpiece (see curve 1), and on the side edges (see curve 2). As the temperature profiles shown in FIG. 5 clearly illustrate, a significant temperature drop occurs in the middle of the laminating cycle on the lower side of the film after strong heating, which is due to the fact that the film, when being sucked onto the heat plate, is at its hottest and begins to cool down immediately upon being lowered onto the workpiece. This is reflected in the temperature progressions on the workpiece: with the hot film being lowered onto the workpiece, the temperature increases rapidly thereon.

The device according to the invention makes it possible to track the process workflow of the lamination in-situ or, after completion of the laminating process, to at least read out and interpret the corresponding data from the data storage devices used. By using a digital camera, it can be illustrated in the simplest possible manner where incomplete lamination takes place. This optically detected process workflow can be evaluated together with the remaining parameters such as temperature, pressure, humidity, and with the acoustic records so that the causes for an incorrect or incomplete lamination behavior or lamination result can be tracked more easily, and the process parameters can then be changed accordingly. Thus, it is possible to improve the thermoforming presses, with or without diaphragm, and to optimize the respective process parameters in a target-oriented manner.

| REFERENCE LIST | |
|---|---|
| 1 | Heating plate |
| 2 | Sealing frame |

-continued

| REFERENCE LIST | |
|---|---|
| 3 | Laying table |
| 4, 4' | Workpiece |
| 5 | Film |
| 6 | Laying pins |
| 7 | Press drawer |
| 10 | Analysis device |
| 11 | Lighting device |
| 11' | Light outlet opening |
| 12 | Image recording device |
| 12' | Lens |
| 12" | Microphone |
| 13 | Data storage device |
| 14 | Accumulator |
| 15 | Temperature recording device |
| 16, 16' | Sensors |
| 17 | Housing |
| 17' | Exchangeable section |
| 18 | Data transfer line |
| 19 | Energy supply line |
| 20 | Thermoforming laminating device |

The invention claimed is:

1. An analysis device for analyzing a thermoforming process in a thermoforming laminating device, wherein the analysis device is disposed in the thermoforming laminating device and comprises a pressure housing having a pressure resistance of up to 5 bar in which at least one image recording device connected to a data storage device and one lighting device are disposed, wherein a lens of the image recording device is disposed adjacent to a light outlet opening of the lighting device on a housing wall of the housing, and wherein the analysis device has a temperature resistance of at least up 50° C.

2. The analysis device according to claim 1, wherein the image recording device is a camera, in particular a digital camera, for recording single images and/or for recording image sequences.

3. The analysis device according to claim 1, wherein the lens of the camera is swivelable.

4. The analysis device according to claim 2, wherein the digital camera has a resolution of at least 640×480 pixels.

5. The analysis device according to claim 1, wherein in the housing of the analysis device, a device for recording acoustic signals is disposed, in particular a microphone which is integrated in the image recording device and is connected to the data storage device.

6. The analysis device according to claim 1, wherein the lighting device is an LED.

7. The analysis device according to claim 1, wherein in the housing of the analysis device at least one temperature recording device is disposed which comprises at least one sensor which is integrated in the housing wall, wherein the sensor is suitable for measuring a prevailing temperature outside of the housing.

8. The analysis device according to claim 7, wherein the temperature recording device is a temperature sensor connected to the data storage device, or a temperature data logger.

9. The analysis device according to claim 1, wherein in the housing of the analysis device at least one pressure measuring device and/or one humidity measuring device, in particular a pressure sensor connected to the data storage device, and/or a humidity sensor connected to the data storage device, and/or a pressure data logger and/or a humidity data logger is disposed.

10. The analysis device according to claim 1, wherein a connection to the data storage device is provided through data transfer lines or wireless data transfer devices, in particular via radio waves.

11. The analysis device according to claim 1, wherein the data storage device is a memory card, in particular a secure digital memory card.

12. The analysis device according to claim 1, wherein the housing is a box having an exchangeable section, wherein the exchangeable section lies in a region in which the at least one sensor of the temperature recording device is disposed.

13. The analysis device according to claim 1, wherein an energy supply for energy-consuming components in the analysis device is provided via an energy source comprising a mains supply connection, at least one accumulator situated in the housing, or at least one battery situated in the housing, wherein the energy source is disposed directly in the consumer or is connected via supply lines to the consumer.

14. A method for analyzing a thermoforming process in a thermoforming laminating device using an analysis device according to claim 1, comprising the steps of disposing a workpiece to be laminated onto a laying table of a thermoforming laminating device, placing a laminating film above the workpiece, disposing the optical analysis device onto the laying table in a thermoforming laminating device close to the workpiece to be laminated, starting the laminating process, wherein the objects disposed on the laying table are subjected to a temperature and pressure application and, at the same time, starting the analyzing process in that at least the image recording device, the data storage device, and the lighting device are put into operation, wherein the lens of the image recording device and the light coming out of the light outlet opening of the lighting device are directed at the workpiece during the laminating process, completing the laminating process and the analyzing process.

15. The method according to claim 14, comprising the step of reading out the data stored by means of the data storage device.

16. The method according to claim 14, wherein the analyzing process comprises putting into operation at least one measuring device from the group comprising:

the device for recording acoustic signals, the temperature recording device, the pressure measuring device, the humidity measuring device.

* * * * *